US011616240B2

(12) United States Patent
Okubo et al.

(10) Patent No.: US 11,616,240 B2
(45) Date of Patent: Mar. 28, 2023

(54) FUEL CELL

(71) Applicant: HONDA MOTOR CO., LTD., Tokyo (JP)

(72) Inventors: Takuro Okubo, Wako (JP); Suguru Omori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/680,246

(22) Filed: Feb. 24, 2022

(65) Prior Publication Data
US 2022/0311020 A1 Sep. 29, 2022

(30) Foreign Application Priority Data

Mar. 25, 2021 (JP) .............................. JP2021-051680

(51) Int. Cl.
*H01M 8/0276* (2016.01)
*H01M 8/0206* (2016.01)
*H01M 8/0258* (2016.01)

(52) U.S. Cl.
CPC ....... *H01M 8/0276* (2013.01); *H01M 8/0206* (2013.01); *H01M 8/0258* (2013.01)

(58) Field of Classification Search
CPC .................................................. H01M 8/0276
See application file for complete search history.

(56) References Cited

U.S. PATENT DOCUMENTS

| 9,017,895 | B2 | 4/2015 | Rock et al. |
| 10,886,556 | B2 | 1/2021 | Tomana et al. |
| 11,018,353 | B2 | 5/2021 | Ohmori |
| 2018/0219233 | A1 | 8/2018 | Ishida et al. |
| 2018/0269497 | A1 | 9/2018 | Kunz et al. |
| 2019/0027772 | A1* | 1/2019 | Tomana .............. H01M 8/0273 |
| 2019/0074524 | A1 | 3/2019 | Tomana et al. |

FOREIGN PATENT DOCUMENTS

| CN | 109616681 A | 4/2019 |
| JP | 2018-125288 A | 8/2018 |
| JP | 2018-533170 A | 11/2018 |
| JP | 2019-021595 A | 2/2019 |
| JP | 2019-186165 A | 10/2019 |
| WO | 2020/195002 A1 | 10/2020 |

OTHER PUBLICATIONS

Office Action including search report dated Dec. 27, 2022 issued over the corresponding Chinese Patent Application No. 202210183296.X with the English translation of the Office Action's pertinent portion.

* cited by examiner

*Primary Examiner* — Brian R Ohara
(74) *Attorney, Agent, or Firm* — Carrier Shende & Associates, P.C.; Joseph P. Carrier; Fulchand P. Shende

(57) ABSTRACT

A fuel cell has a tunnel protruding from a passage bead seal toward a passage to thereby allow an internal space of the passage bead seal to communicate with the passage, and an extending portion located on a side of the tunnel so as to extend from the passage bead seal toward the passage, the extending portion being lower in height than the tunnel.

6 Claims, 11 Drawing Sheets

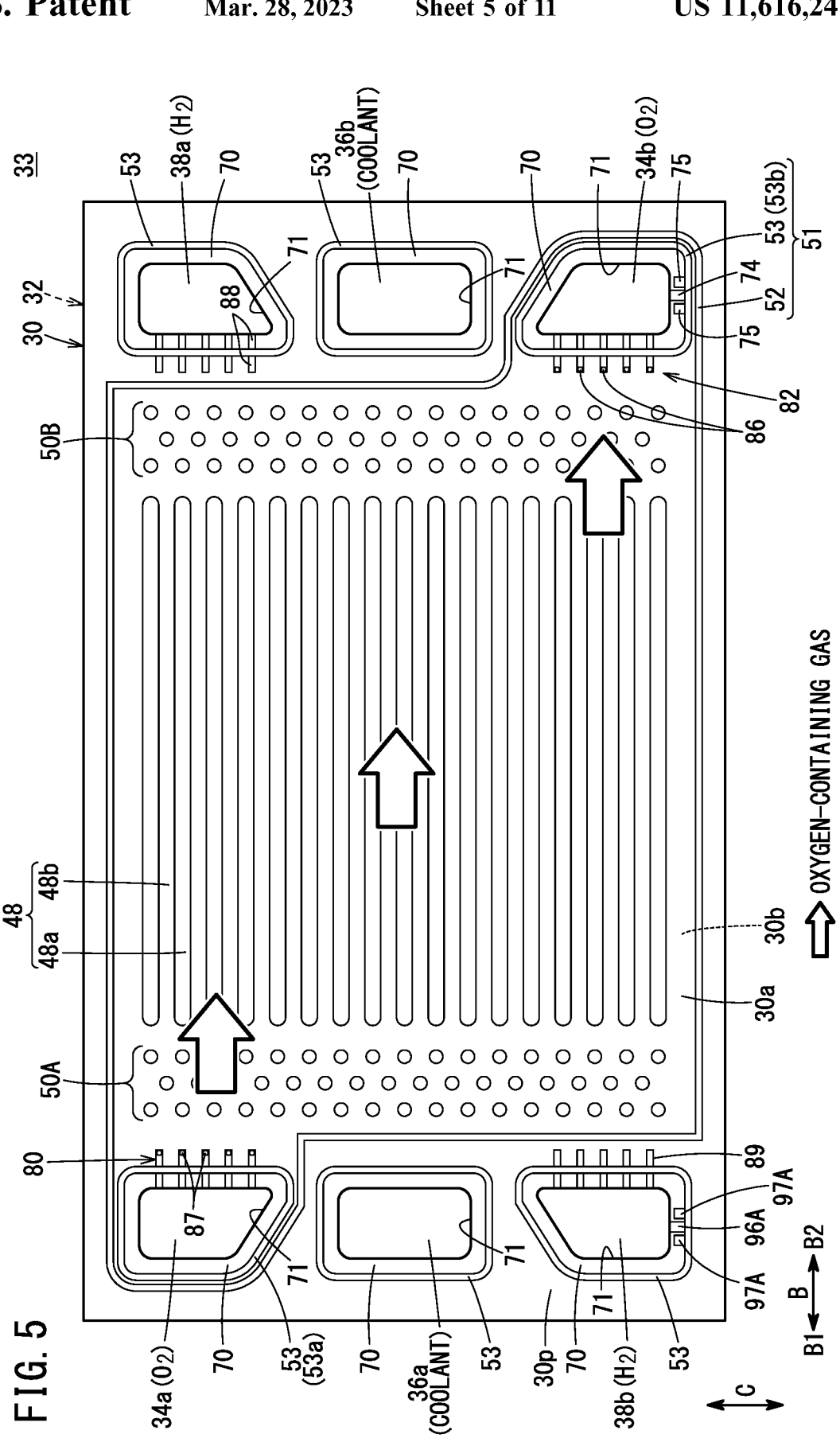

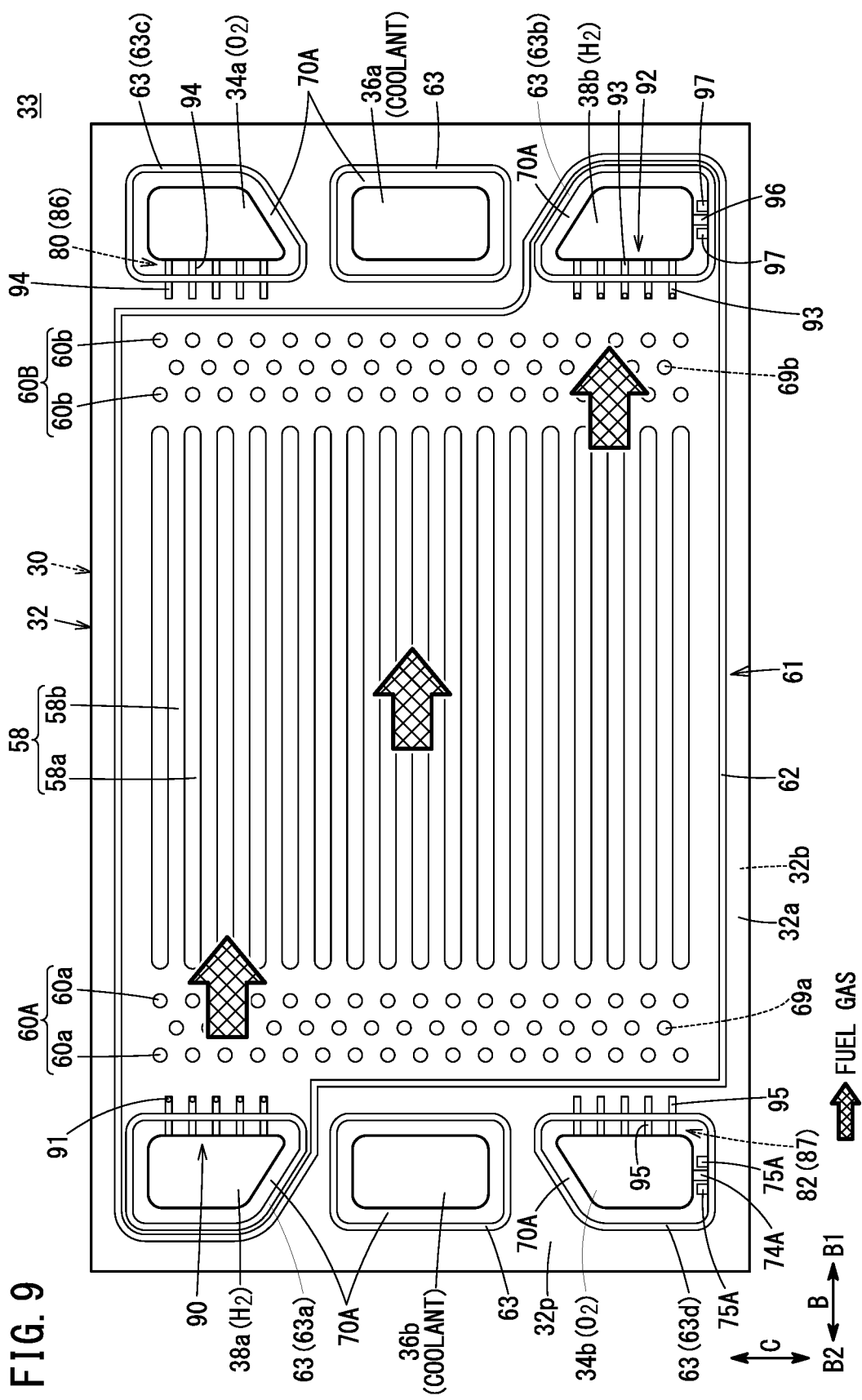

FUEL CELL

CROSS-REFERENCE TO RELATED APPLICATIONS

This application is based upon and claims the benefit of priority from Japanese Patent Application No. 2021-051680 filed on Mar. 25, 2021, the contents of which are incorporated herein by reference.

BACKGROUND OF THE INVENTION

Field of the Invention

The present invention relates to a fuel cell including a bead seal.

Description of the Related Art

In general, a solid polymer electrolyte fuel cell contains solid polymer electrolyte membranes which are made up from a polymer ion exchange membrane. A fuel cell has an anode on one surface of the solid polymer electrolyte membrane and a cathode on the other surface of the solid polymer electrolyte membrane. The solid polymer electrolyte membrane, the anode, and the cathode form a membrane electrode assembly (MEA).

A power generation cell has a structure in which a membrane electrode assembly is sandwiched between separators (bipolar plates). The power generation cell constitutes a unit fuel cell. By stacking a predetermined number of such power generation cells, the power generation cells are used, for example, as a vehicle fuel cell stack.

The fuel cell has a fuel gas flow field between the MEA and one of the separators. The fuel gas flow field is one of the reactant gas flow fields. The fuel cell has an oxygen-containing gas flow field as the other reactant gas flow field between the MEA and the other separator. In addition, a coolant flow field through which a coolant flows is provided between one separator and the other separator.

In the fuel cell stack, a plurality of reactant gas passages and coolant passages are formed so as to extend through the fuel cell stack along the stacking direction. In the present specification, the reactant gas passages and the coolant passages are also collectively referred to as passages. For example, a separator disclosed in JP 2018-533170 A has a passage bead seal disposed along an outer periphery of a passage so as to seal the passage and a reactant gas flow field. The passage bead seal is a sealing protrusion protruding in the separator thickness direction. Further, the passage bead seal disclosed in JP 2018-533170 A has a tunnel (connection channel) as a structure for communicating the passage with the reactant gas flow field. The tunnel is provided so as to protrude in the width direction of the passage bead seal.

SUMMARY OF THE INVENTION

The passage bead seal has a polygonal shape in which a corner portion and a straight portion are combined. In this case, a curved portion forming the corner portion of the passage bead seal and a portion where the tunnel is present tend to have relatively high rigidity and increased surface pressure. On the other hand, a straight portion sandwiched between the curved portion and the tunnel, and a gentle curve close to the straight portion have relatively low rigidity (soft). These straight portions and gentle curves are portions where the surface pressure decreases when the passage bead seal abuts against the MEA.

Therefore, an object of the present invention is to suppress a decrease in surface pressure of a bead seal in a fuel cell by preventing variation in surface pressure between a portion provided with a tunnel or a corner portion and another portion, of the bead seal.

According to an aspect of the present invention, there is provided a fuel cell including a membrane electrode assembly and metal separators disposed on both sides of the membrane electrode assembly, the membrane electrode assembly and the metal separators being stacked together, wherein each of the metal separators is formed: with a reactant gas flow field through which a reactant gas flows along an electrode surface of the membrane electrode assembly; a passage that penetrates through the separator in a separator thickness direction; and a passage bead seal that surrounds the passage and protrudes in the separator thickness direction to thereby seal the passage, the passage bead seal is provided with a tunnel that protrudes from the passage bead seal toward the passage, the tunnel being configured to allow an internal space of the passage bead seal to communicate with the passage, and the passage bead seal is further provided with an extending portion which is disposed adjacent to at least one side wall of the tunnel so as to extend from the passage bead seal toward the passage, the extending portion being lower in height than the tunnel.

In the fuel cell according to the above aspect, variation in surface pressure, of the bead seal, between a portion where the tunnel or the like is provided and the other portion can be reduced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a plan view of the joint separator (first metal separator);

FIG. 9 is a plan view of a joint separator (second metal separator);

DESCRIPTION OF THE INVENTION

First Embodiment

Figure 1:
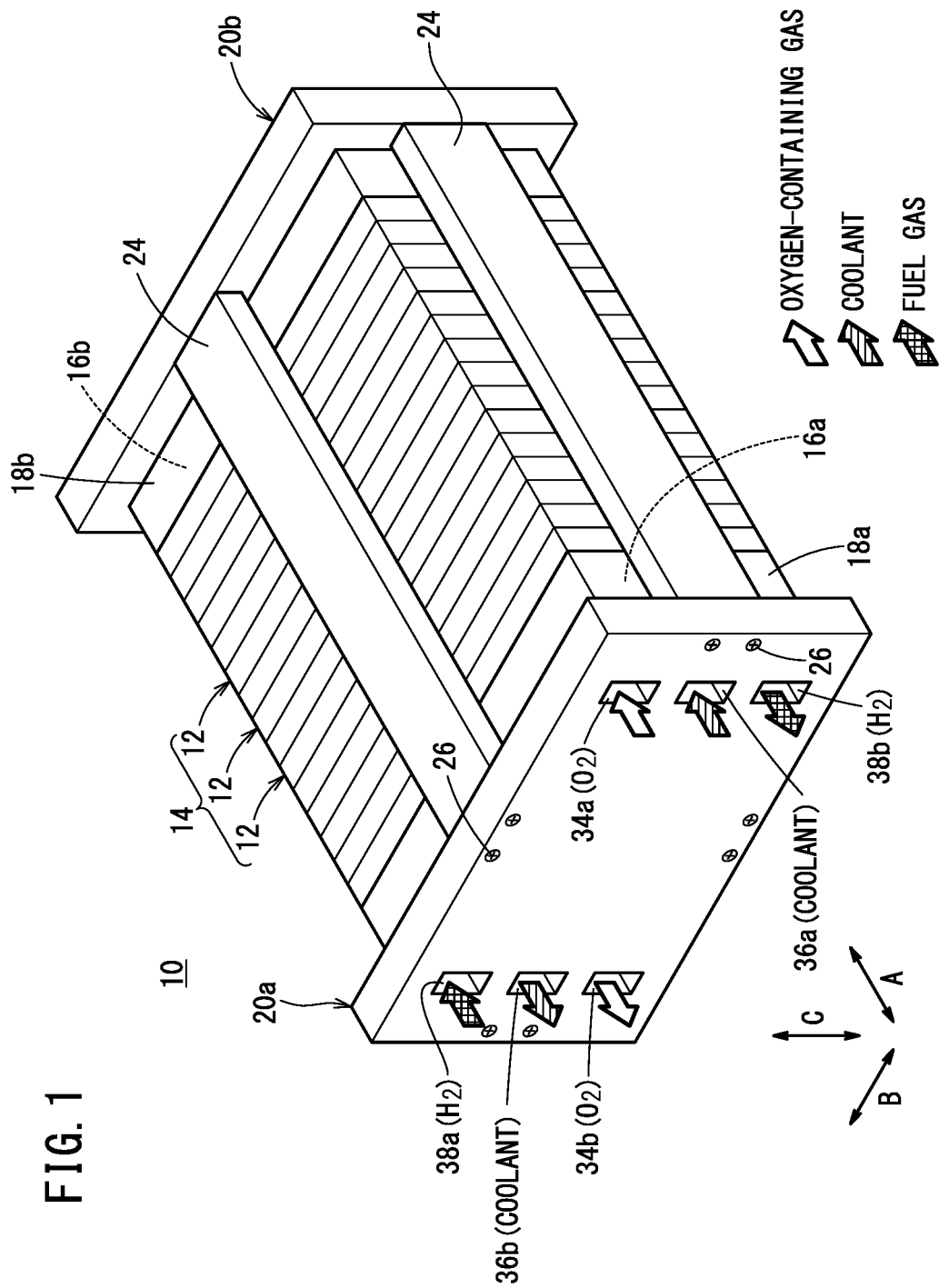
FIG. 1 is a perspective explanatory view of a fuel cell stack.
Figure 2:
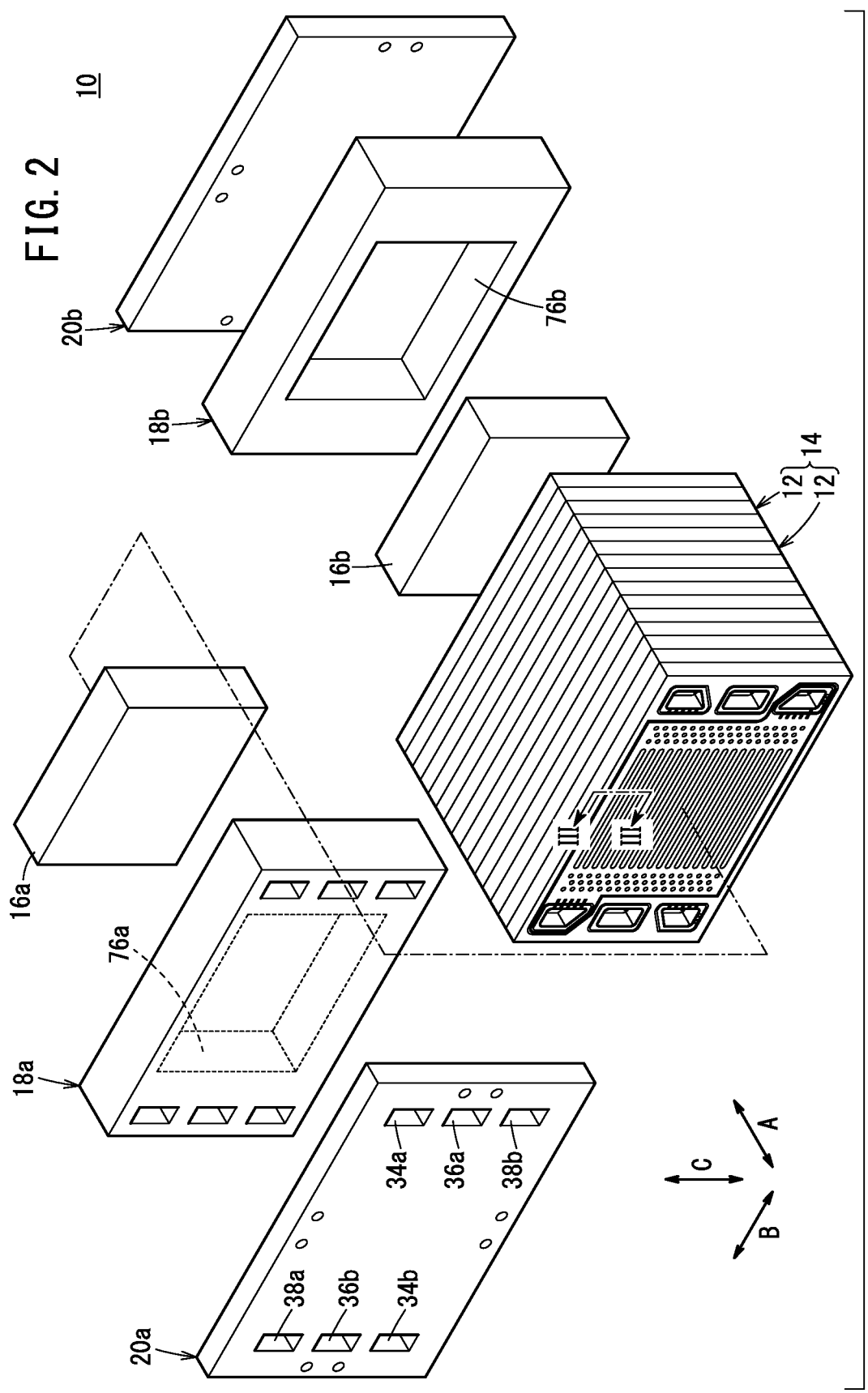
FIG. 2 is an exploded perspective view of the fuel cell stack.

As shown in FIGS. 1 and 2, a fuel cell stack 10 includes a stack body 14 having a plurality of fuel cells 12 stacked together. The fuel cell 12 is one power generation cell. In the stack body 14, the fuel cells 12 are stacked in a horizontal direction (arrow A direction) or a gravity direction (arrow C direction). The fuel cell stack 10 is used as, for example, a fuel cell electric vehicle or a private power generation facility of a facility.

The stack body 14 has a terminal plate 16a, an insulator 18a, and an end plate 20a at one end in the stacking direction (the arrow A direction). The terminal plate 16a, the insulator 18a, and the end plate 20a are arranged in this order toward the outside of the stack body 14 (see FIG. 2). The stack body 14 has a terminal plate 16b, an insulator 18b, and an end plate 20b at the other end in the stacking direction. The terminal plate 16b, the insulator 18b, and the end plate 20b are arranged in this order toward the outside of the stack body 14.

As shown in FIG. 1, the end plates 20a and 20b are formed in a horizontally long (or vertically long) rectangular shape. A connecting bar 24 is disposed between each side of the end plate 20a and each side of the end plate 20b. Both ends of each connecting bar 24 are fixed to the respective inner surfaces of the end plates 20a and 20b by bolts 26. These connecting bars 24 apply a tightening load in the stacking direction (direction of arrow A) of the plurality of stacked fuel cells 12. The fuel cell stack 10 may include a housing having end plates 20a and 20b as end plates. In this case, the housing accommodates the stack body 14 therein.

Figure 3:
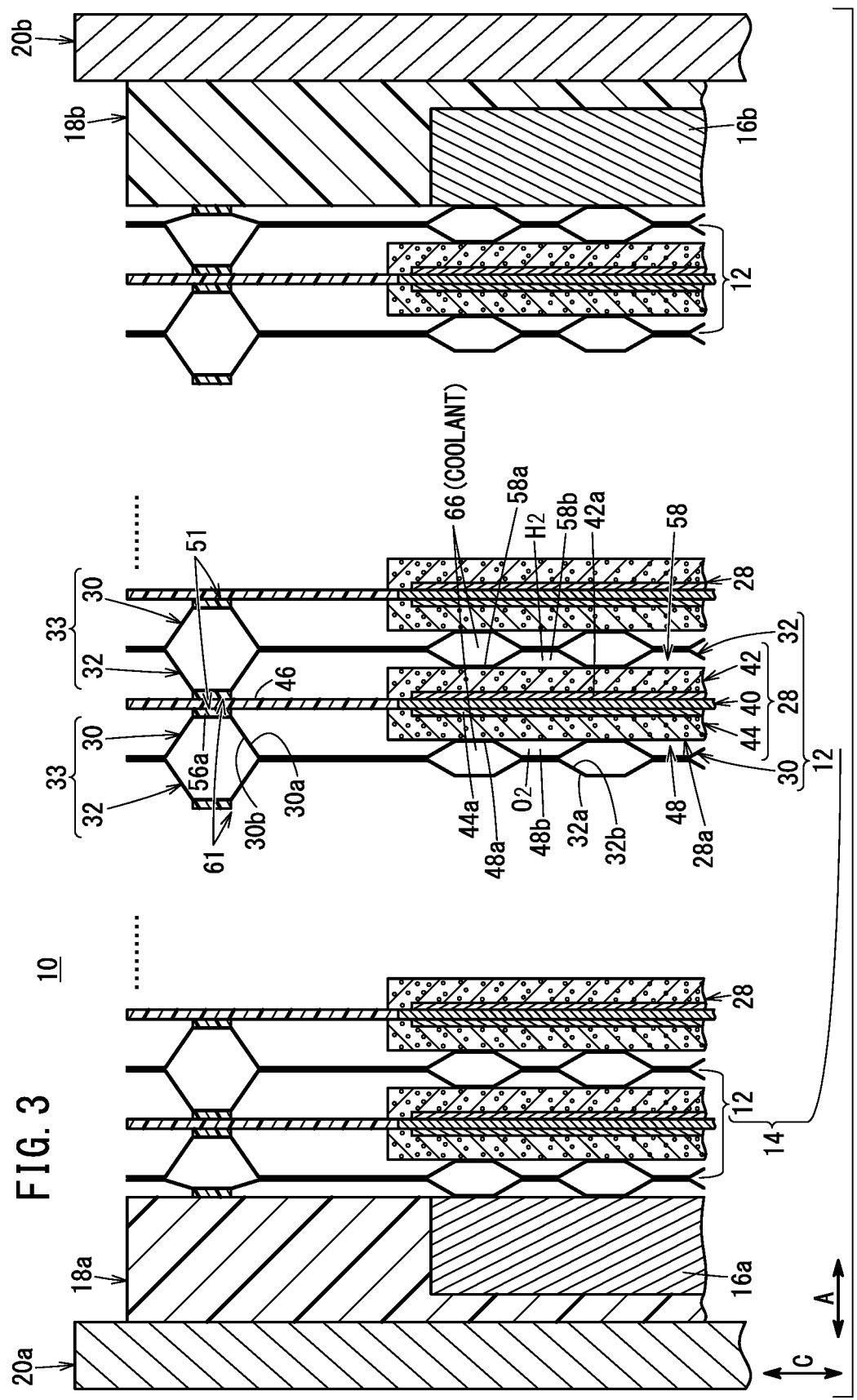
FIG. 3 is a cross-sectional view taken along line III-III of FIG. 2.
Figure 4:
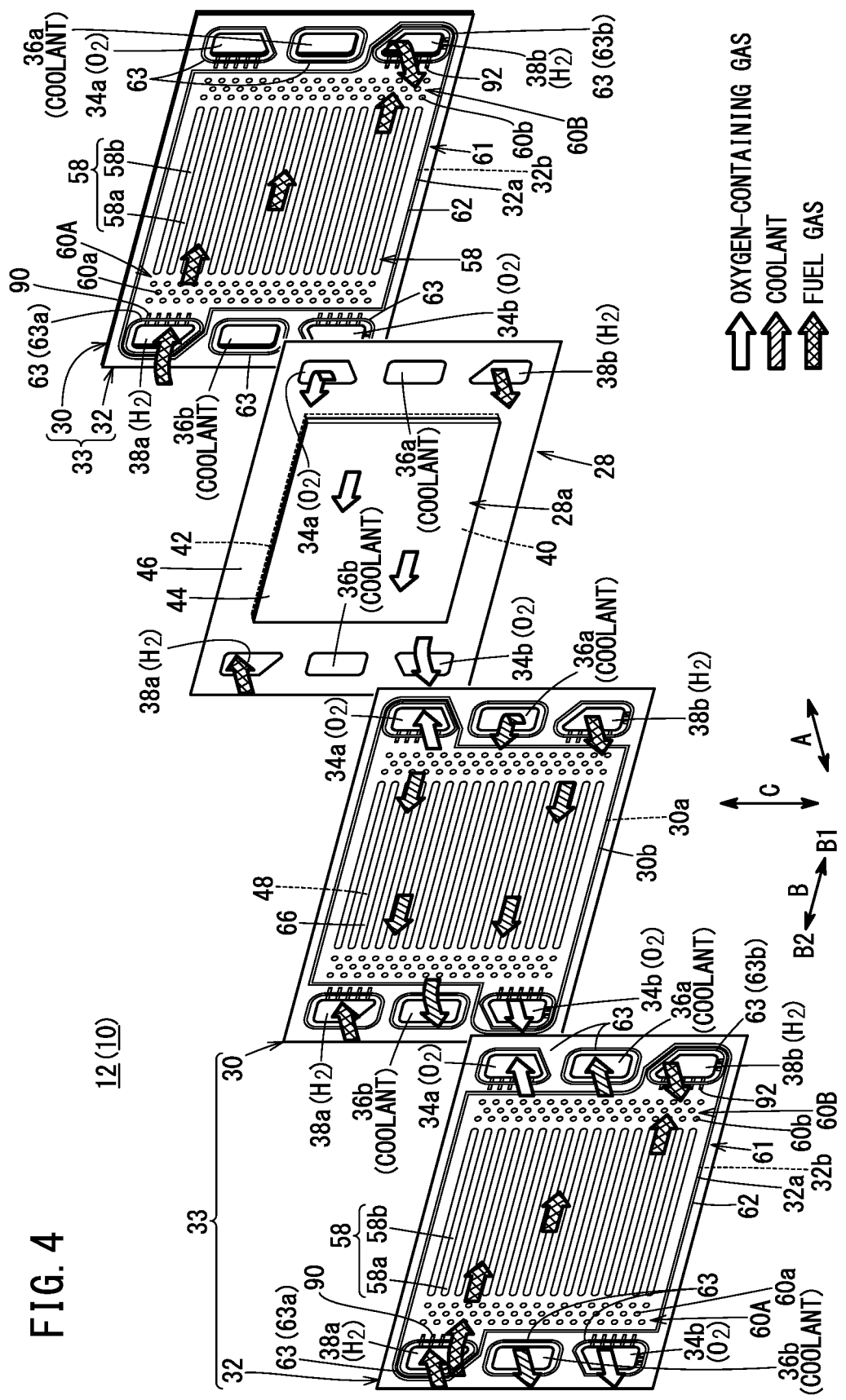
FIG. 4 is an exploded perspective view of a power generation cell constituting the fuel cell stack.

As shown in FIGS. 3 and 4, the fuel cell 12 includes a resin film equipped membrane electrode assembly (resin film equipped MEA) 28, a first metal separator 30, and a second metal separator 32. The resin film equipped MEA 28 includes a frame-shaped resin film 46 on the outer periphery. The first metal separator 30 and the second metal separator 32 sandwich the resin film equipped MEA 28. Each of the first metal separator 30 and the second metal separator 32 is made of, for example, a steel plate, a stainless steel plate, an aluminum plate, a plated steel plate, or a metal thin plate whose metal surface is subjected to anti-corrosion surface treatment. The first metal separator 30 and the second metal separator 32 have a corrugated cross-section. The first metal separator 30 and the second metal separator 32 are formed by press forming. The outer peripheral portions of the first metal separator 30 and the second metal separator 32 are joined and integrated by a method such as welding, brazing, or crimping, to form a joint separator 33.

As shown in FIG. 4, the fuel cells 12 each have an oxygen-containing gas supply passage 34a, a coolant supply passage 36a, and a fuel gas discharge passage 38b at one end in the direction indicated by the arrow B (the horizontal direction in FIG. 4), which is the long-side direction. The oxygen-containing gas supply passage 34a, the coolant supply passage 36a, and the fuel gas discharge passage 38b are arranged in the direction indicated by the arrow C. Oxygen-containing gas, for example, is supplied to the oxygen-containing gas supply passage 34a. The coolant supply passage 36a supplies a coolant (refrigerant). The fuel gas discharge passage 38b discharges, for example, a hydrogen-containing gas as the fuel gas.

The fuel cells 12 each have a fuel gas supply passage 38a, a coolant discharge passage 36b, and an oxygen-containing gas discharge passage 34b at the other end in the direction of the arrow B. The fuel gas supply passage 38a, the coolant discharge passage 36b, and the oxygen-containing gas discharge passage 34b are arranged in the direction indicated by arrow C. The fuel gas supply passage 38a supplies the fuel gas. The coolant discharge passage 36b discharges the coolant. The oxygen-containing gas is discharged from the oxygen-containing gas discharge passage 34b. The number and layout of the oxygen-containing gas supply passage 34a, the oxygen-containing gas discharge passage 34b, the coolant supply passage 36a, the coolant discharge passage 36b, the fuel gas supply passage 38a, and the fuel gas discharge passage 38b are not limited to those in the present embodiment. The number and layout thereof are appropriately set according to a required specification.

As shown in FIG. 3, the resin film equipped MEA 28 includes a membrane electrode assembly 28a. The membrane electrode assembly 28a includes an electrolyte membrane 40, and an anode 42 and a cathode 44 sandwiching the electrolyte membrane 40.

The electrolyte membrane 40 is, for example, a solid polymer electrolyte membrane (cation exchange membrane). For example, the solid polymer electrolyte membrane is a thin membrane of perfluorosulfonic acid containing water. As the electrolyte membrane 40, a HC-based (hydrocarbon-based) electrolyte membrane can be used in addition to a fluorine-based electrolyte. The electrolyte membrane 40 has a surface size smaller than those of the anode 42 and the cathode 44.

The frame-shaped resin film 46 is sandwiched between an edge portion of the outer periphery of the anode 42 and an edge portion of the outer periphery of the cathode 44. An inner peripheral end of the resin film 46 is close to an outer peripheral end of the electrolyte membrane 40. The inner peripheral end of the resin film 46 may overlap the outer peripheral end of the electrolyte membrane 40. The inner peripheral end of the resin film 46 may be in contact with the outer peripheral end of the electrolyte membrane 40. As shown in FIG. 4, the resin film 46 has an oxygen-containing gas supply passage 34a, a coolant supply passage 36a, and a fuel gas discharge passage 38b at one end in the direction indicated by the arrow B. The resin film 46 has a fuel gas supply passage 38a, a coolant discharge passage 36b, and an oxygen-containing gas discharge passage 34b at the other end in the direction of arrow B.

The resin film 46 is made of, for example, polyphenylene sulfide (PPS), polyphthalamide (PPA), polyethylene naphthalate (PEN), polyether sulfone (PES), liquid crystal polymer (LCP), polyvinylidene fluoride (PVDF), silicone resin, fluororesin, modified polyphenylene ether resin (m-PPE), polyethylene terephthalate (PET), polybutylene terephthalate (PBT), or modified polyolefin. Note that the electrolyte membrane 40 may protrude outward without using the resin film 46. The electrolyte membrane 40 protruding outward may have frame-shaped films on both sides thereof in the thickness direction.

As shown in FIG. 4, the first metal separator 30 has a surface 30a facing a resin film equipped MEA 28. The surface 30a has, for example, an oxygen-containing gas flow field 48 extending in the direction of arrow B. As shown in FIG. 5, the oxygen-containing gas flow field 48 fluidly communicates with the oxygen-containing gas supply passage 34a and the oxygen-containing gas discharge passage 34b. The oxygen-containing gas flow field 48 has a plurality of straight-line-shaped flow grooves 48b. The straight-line-shaped flow grooves 48b are formed between a plurality of convex portions 48a extending in the direction of arrow B. The oxygen-containing gas flow field 48 may have a plurality of wavy flow grooves instead of the plurality of straight-line-shaped flow grooves 48b.

The first metal separator 30 has a first seal line 51 on the surface 30a. The first seal line 51 is also called a metal bead seal, and is formed by press forming. The first seal line 51 bulges toward the resin film equipped MEA 28. The first seal line 51 includes an outer bead seal 52 and a plurality of passage bead seals 53 (bead seals). As shown in FIG. 3, the tip end surface of the convex portion constituting the first seal line 51 has a resin material 56a. The resin material 56a is firmly fixed by printing, coating or the like. For example, polyester fiber is used as the resin material 56a. The resin material 56a is not essential and may be omitted.

As shown in FIG. 5, the outer bead seal 52 protrudes from the surface 30a of the first metal separator 30 toward the resin film equipped MEA 28 (FIG. 4). The outer bead seal 52 surrounds the oxygen-containing gas flow field 48, an inlet buffer 50A, and an outlet buffer 50B.

The plurality of passage bead seals 53 are formed integrally with the first metal separator 30. The passage bead seal 53 protrudes from the surface 30a toward the resin film equipped MEA 28. The plurality of passage bead seals 53 surround the oxygen-containing gas supply passage 34a, the oxygen-containing gas discharge passage 34b, the coolant supply passage 36a, the coolant discharge passage 36b, the fuel gas supply passage 38a, and the fuel gas discharge passage 38b, respectively.

Each passage bead seal 53 has a polygonal shape formed by joining a plurality of straight portions together through smooth bent portions in plan view. The planar shape of the passage bead seal 53 may be, for example, a quadrangular shape, a pentagonal shape, or a hexagonal shape. The straight portion of the passage bead seal 53 means a portion that appears to be a straight line in a global view, and is not necessarily limited to a strictly straight-line shaped pattern. For example, a pattern that extends linearly in a predetermined direction in a global view while meandering in a waveform in a plan view is also included in the straight portion.

Figure 6A:
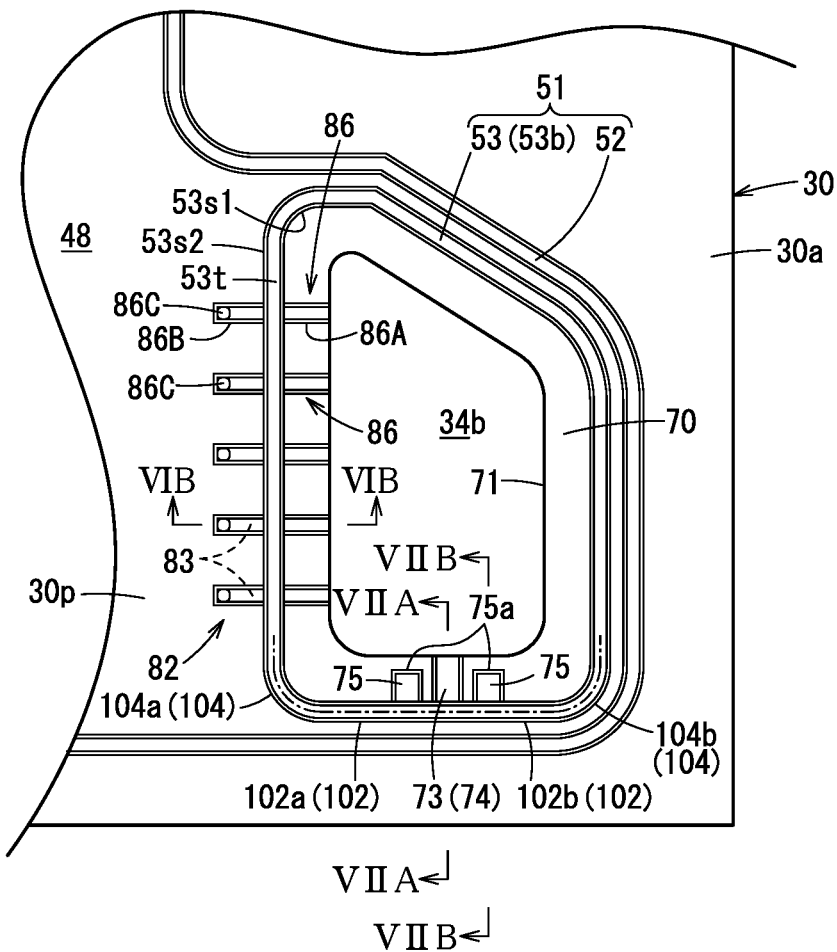
FIG. 6A is a plan view of a passage bead seal surrounding an oxygen-containing gas discharge passage in the first metal separator according to a first embodiment.

As shown in FIG. 6A, the passage bead seal 53 of the oxygen-containing gas discharge passage 34b has an inner peripheral side wall 53s1 and an outer peripheral side wall 53s2 extending upward from a base plate portion 30p constituting the main surface of the first metal separator 30, and a top portion 53t connecting the inner peripheral side wall 53s1 and the outer peripheral side wall 53s2. The inner peripheral side wall 53s1 and the outer peripheral side wall 53s2 of the passage bead seal 53 are inclined with respect to the separator thickness direction (the normal direction of the base plate portion 30p). Therefore, as shown in FIG. 6B, the passage bead seal 53 has a trapezoidal cross-sectional shape along the separator thickness direction.

Figure 6B:
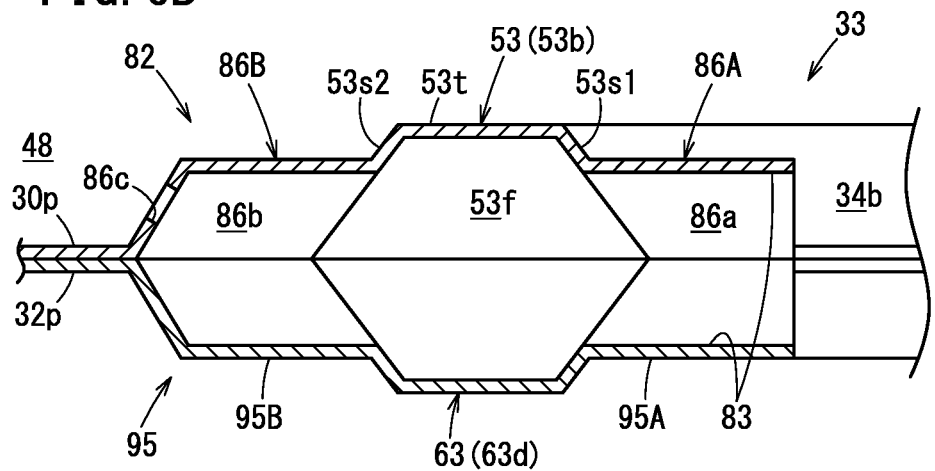
FIG. 6B is a cross-sectional view taken along line VIB-VIB of FIG. 6A.

It should be noted that the inner peripheral side wall 53s1 and the outer peripheral side wall 53s2 of the passage bead seal 53 may be parallel to the separator thickness direction (vertical direction in FIG. 6B). In this case, the passage bead seal 53 is formed to have a rectangular cross section along the separator thickness direction.

As shown in FIG. 5, the first metal separator 30 has a plurality of flange portions 70 flush with the base plate portion 30p, inside the passage bead seal 53 (between the passage bead seal 53 and the passage). The flange portions 70 extend from the base portion of the passage bead seal 53 toward the oxygen-containing gas supply passage 34a, the oxygen-containing gas discharge passage 34b, the coolant supply passage 36a, the coolant discharge passage 36b, the fuel gas supply passage 38a, or the fuel gas discharge passage 38b. The inner peripheral edge 71 of the flange portion 70 constitutes edges of the passages 34a, 34b, 36a, 36b, 38a, and 38b.

Here, description is given concerning the oxygen-containing gas discharge passage 34b and the passage bead seal 53b thereof. As shown in FIG. 6A, the passage bead seal 53b surrounding the oxygen-containing gas discharge passage 34b is surrounded by the outer bead seal 52. The passage bead seal 53b includes a bridge portion 82, a tunnel 74, and extending portions 75. The bridge portion 82 is a region where one or a plurality of connection channels 83 are formed. The connection channel 83 is a flow path that connects the inside of the passage bead seal 53 (the direction facing the oxygen-containing gas discharge passage 34b) and the outside thereof (the direction facing the oxygen-containing gas flow field 48). The tunnel 74 constitutes a drain flow path 73 for removing retained water at the bottom of the oxygen-containing gas discharge passage 34b. The extending portions 75 are adjacent to the tunnel 74.

The bridge portion 82 is disposed at the annular passage bead seal 53b surrounding the oxygen-containing gas discharge passage 34b. The bridge portion 82 is disposed on a side, of the passage bead seal 53b, adjacent to and closest to a power generation portion (i.e., disposed on one of the sides of the polygonal shape of the passage bead seal, that is adjacent to and closest to a power generation portion). The bridge portion 82 of the passage bead seal 53b allows the oxygen-containing gas flow field 48 to communicate with the oxygen-containing gas discharge passage 34b.

As shown in FIG. 6A, the bridge portion 82 has a plurality of connection channels 83. Each connection channel 83 protrudes from a side wall of the passage bead seal 53b. The connection channel 83 has a tunnel 86 formed so as to bulge in the separator thickness direction. The connection channel 83 is formed by press forming. The tunnel 86 of the connection channel 83 has an inner tunnel 86A and an outer tunnel 86B. The inner tunnel 86A protrudes from the inner peripheral side wall 53s1 of the passage bead seal 53b toward the oxygen-containing gas discharge passage 34b. One or a plurality of the inner tunnels 86A are provided. The outer tunnel 86B protrudes from the outer peripheral side wall 53s2 of the passage bead seal 53b toward the oxygen-containing gas flow field 48. One or a plurality of the outer tunnels 86B are provided.

The inner tunnels 86A and the outer tunnels 86B protrude from the passage bead seal 53b in directions opposite to each other. The inner tunnels 86A are disposed face-to-face with the respective outer tunnels 86B across the passage bead seal 53b. Note that the inner tunnels 86A and the outer tunnels 86B may be alternately arranged in a zigzag manner along the extending direction of the passage bead seal 53b.

As shown in FIG. 6B, an end portion of each of the plurality of inner tunnels 86A on a side opposite to a side connected to the passage bead seal 53b opens toward the oxygen-containing gas discharge passage 34b. The outer tunnels 86B are arranged at intervals along the extending direction of the passage bead seal 53b. Each outer tunnel 86B has an opening 86c at an end on a side opposite to a side connected to the passage bead seal 53b. The opening 86c penetrates from the inside to the outside of the outer tunnel 86B.

The internal space 53f of the passage bead seal 53b communicates with the internal space 86a of the inner tunnel 86A. The internal space 53f communicates with the internal space 86b of the outer tunnel 86B. Thus, the oxygen-containing gas discharge passage 34b communicates with the oxygen-containing gas flow field 48 (see FIG. 5) through the inner tunnel 86A, the passage bead seal 53b, and the outer tunnel 86B, which make up the bridge portion 82.

The tunnel 74 and the extending portions 75 convexly bulge in the direction of the separator thickness direction, similar to the inner tunnel 86A of the bridge portion 82 (FIG. 6A). The tunnel 74 and the extending portions 75 are integrally formed. The tunnel 74 extends from the inner peripheral side wall 53s1 of the passage bead seal 53b toward the inner peripheral edge 71 of the flange portion 70. The inner peripheral edge portion of the tunnel 74 is opened at the inner peripheral edge 71 of the flange portion 70.

Figure 8:
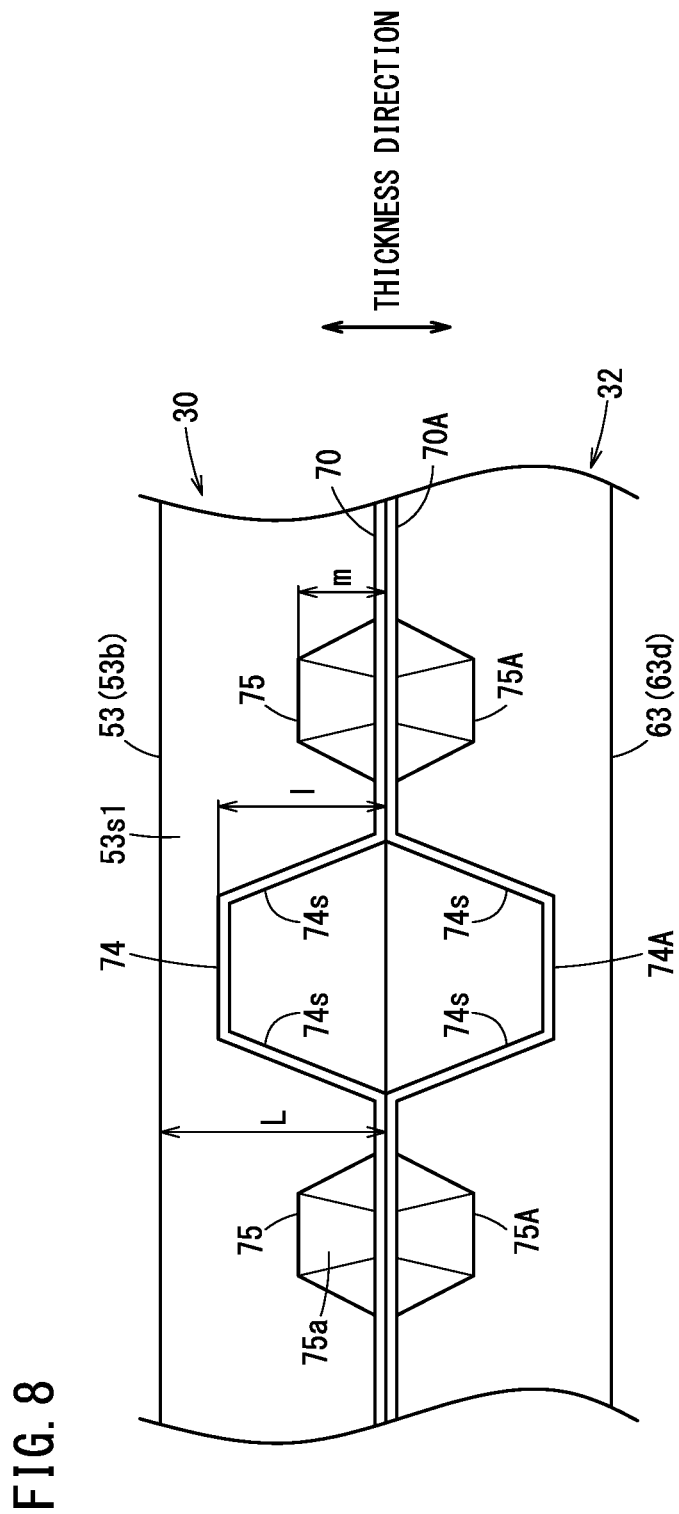
FIG. 8 is an end view of a tunnel and an extending portion of FIG. 6A as viewed from the inside of the passage.

As shown in FIG. 8, the cross section of the tunnel 74 is formed in a trapezoidal shape tapered toward the tip, and each side wall 74s of the tunnel 74 is inclined with respect to the separator thickness direction. The length (height l) of the tunnel 74 protruding from the flange portion 70 in the separator thickness direction is shorter than the height L of the passage bead seal 53b. Further, the bottom side length (width), the upper side length (width), and the height of the tunnel 74 can be set to the same values as the bottom side length (width), the upper side length (width), and the height of the inner tunnel 86A (FIG. 6A) of the bridge portion 82.

As shown in FIG. 6A, the extending portion 75 is formed on the straight portion 102 of the passage bead seal 53b adjacent to the tunnel 74. That is, the passage bead seal 53b has the straight portion 102 between the two corner portions 104a and 104b. The extending portion 75 is formed on the straight portion 102 between the tunnel 74 and the corner portion 104a. Further, the other extending portion 75 is formed on the straight portion 102 between the tunnel 74 and the corner portion 104b.

The extending portion 75 extends from the inner peripheral side wall 53s1 of the passage bead seal 53b toward the inner peripheral edge 71 of the flange portion 70. The extending portion 75 is formed shorter than the flange portion 70. The inner peripheral end portion 75a of the extending portion 75 is located outside the inner peripheral edge 71 of the flange portion 70. The inner peripheral end portion 75a of the extending portion 75 is formed into an inclined wall shape. The extending portion 75 does not communicate with the oxygen-containing gas discharge passage 34b and is closed by the inner peripheral end portion 75a.

Figure 7A:
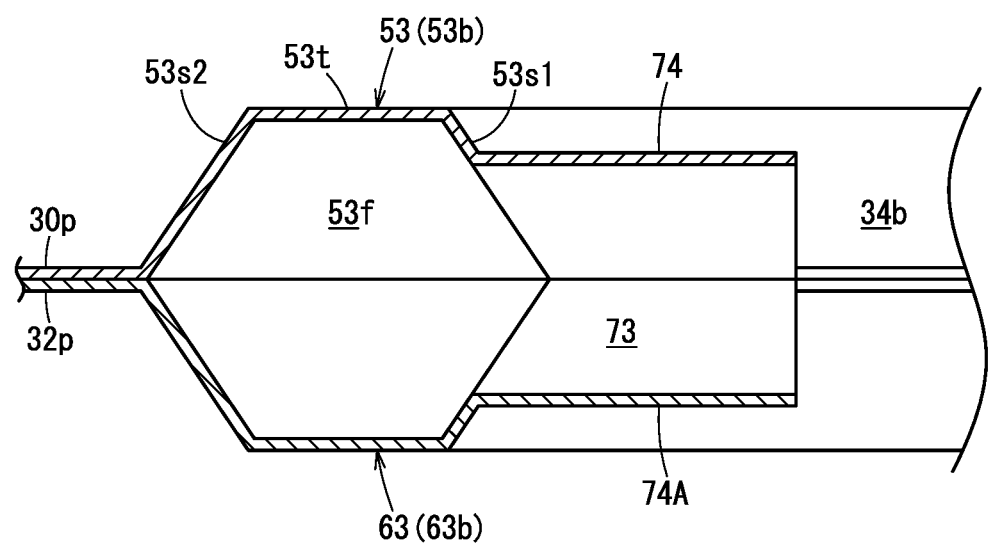
FIG. 7A is a cross-sectional view taken along line VIIA-VIIA of FIG. 6A.
Figure 7B:
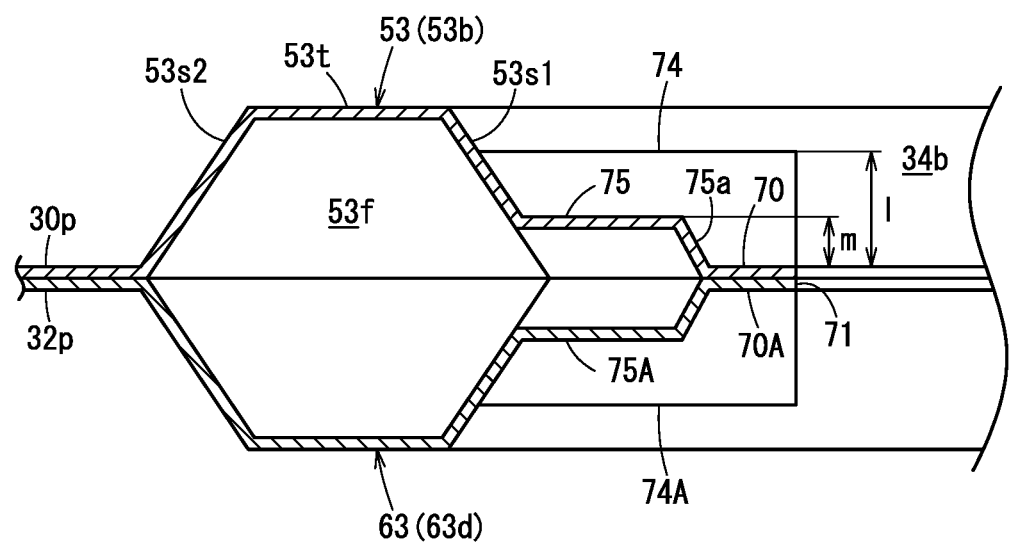
FIG. 7B is a cross-sectional view taken along line VIIB-VIIB of FIG. 6A.

As shown in FIGS. 7B and 8, the height m of the extending portion 75 is lower than the height l of the tunnel 74. The height m of the extending portion 75 may be approximately half the height l of the tunnel 74.

In the above description, an example in which the pair of extending portions 75 adjacent to both side walls 74s of the tunnel 74 are provided has been described, but the present embodiment is not limited thereto. For example, in a case where the tunnel 74 is provided near the corner portion 104a or 104b, the extending portion 75 may be provided only at a position adjacent to one side wall 74s of the tunnel 74. Further, the tunnel 74 may be formed for other purposes such as reinforcement in addition to drainage. The tunnel 74 and the extending portion 75 may be formed on a side of the passage bead seal 53b where the bridge portion 82 is not provided.

Further, the tunnel 74 and the extending portion 75 need not necessarily be formed only in a strict straight-line pattern of the passage bead seal 53b. That is, in the passage bead seal 53b, the tunnel 74 and the extending portion 75 may be formed in a portion (straight-line pattern in a broad sense) extending linearly in a global view while meandering slightly between the corner portions 104 bent at a large angle.

As shown in FIG. 5, a tunnel 96A similar to the tunnel 74 is also formed at the passage bead seal 53 surrounding the fuel gas discharge passage 38b. The passage bead seal 53 has an extending portion 97A similar to the extending portion 75, adjacent to a side wall of the tunnel 96A.

As shown in FIG. 4, the second metal separator 32 has a surface 32a facing the resin film equipped MEA 28. The second metal separator 32 has a fuel gas flow field 58 on the surface 32a. The fuel gas flow field 58 extends, for example, in the direction of arrow B. As shown in FIG. 9, the fuel gas flow field 58 fluidly communicates with the fuel gas supply passage 38a and the fuel gas discharge passage 38b. The fuel gas flow field 58 has a plurality of straight-line-shaped flow grooves 58b. The straight-line-shaped flow grooves 58b are formed between a plurality of convex portions 58a extending in the direction of arrow B. The second metal separator 32 may have a plurality of wavy flow grooves instead of the plurality of straight-line-shaped flow grooves 58b.

An inlet buffer 60A is provided between the fuel gas supply passage 38a and the fuel gas flow field 58 on the surface 32a of the second metal separator 32. The inlet buffer 60A has a plurality of bosses 60a arranged in the direction of arrow C. Further, the second metal separator 32 has an outlet buffer 60B between the fuel gas discharge passage 38b and the fuel gas flow field 58 on the surface 32a. The outlet buffer 60B has a plurality of bosses 60b.

The second metal separator 32 has a back surface 32b on a side opposite to the fuel gas flow field 58. The back surface 32b has a row of a plurality of bosses 69a arranged in the arrow C direction, between the rows of the bosses of the inlet buffer 60A. The back surface 32b has a row of a plurality of bosses 69b arranged in the arrow C direction, between the rows of the bosses of the outlet buffer 60B. The bosses 69a and 69b constitute buffers on the coolant surface side.

A second seal line 61 is formed on the surface 32a of the second metal separator 32 so as to protrude toward the resin film equipped MEA 28. The second seal line 61 is formed by press forming. The second seal line 61 includes an outer bead seal 62 and a plurality of passage bead seals 63 (bead seals). The outer bead seal 62 protrudes from the surface 32a of the second metal separator 32 toward the resin film equipped MEA 28. The outer bead seal 62 surrounds the fuel gas flow field 58, the inlet buffer 60A and the outlet buffer 60B, and the fuel gas supply passage 38a and the fuel gas discharge passage 38b.

As shown in FIG. 9, the plurality of passage bead seals 63 integrally protrude from a base plate portion 32p of the surface 32a of the second metal separator 32. The plurality of passage bead seals 63 individually surround the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. The second metal separator 32 has a plurality of flat flange portions 70A extending along the surface 32a direction, inside each of the passage bead seals 63. The passage bead seals 63a and 63b have the same structure as the passage bead seals 53a and 53b (FIG. 5) provided on the first metal separator 30.

As shown in FIG. 9, a plurality of tunnels 74A, 91, 93, 94, 95, and 96 protruding in the separator surface direction protrude from the passage bead seals 63 surrounding the passages 34a, 34b, 38a, and 38b. These tunnels 74A, 91, 93, 94, 95, and 96 are disposed at positions corresponding to the plurality of tunnels 74, 86, 87, 88, 89 and 96A (see FIG. 5) provided in the first metal separator 30. The tunnels 74A, 91, 93, 94, 95, 96 bulge toward the resin film equipped MEA 28 adjacent to the second metal separator 32, on a side opposite to the first metal separator 30. Each of the tunnels 74A, 91, 93, 94, 95, and 96 has a trapezoidal cross-sectional shape along the separator thickness direction.

The second metal separator 32 has tunnels 74A, 96. The tunnels 74A, 96 are formed in the respective flange portions 70A of the passage bead seals 63b and 63d. The tunnels 74A, 96 constitute drain flow paths 73. As shown in FIG. 7A, the tunnel 74A of the second metal separator 32 is formed at a portion corresponding to the tunnel 74 of the first metal separator 30. The tunnel 96 is formed in a portion corresponding to the tunnel 96A. The tunnels 74A, 96 have the same structure as the tunnels 74, 96A provided in the flange portion 70 of the first metal separator 30. The second metal separator 32 has extending portions 75A, 97 adjacent to side walls of the tunnels 74A, 96. The extending portions 75A and 97 are formed at portions corresponding to the extending portions 75 and 97A of the first metal separator 30. The extending portions 75A and 97 have the same structure as the extending portions 75 and 97A.

As shown in FIGS. 3 and 4, a coolant flow field 66 is formed between back surfaces 30b, 32b of the first metal separator 30 and the second metal separator 32 that are joined to each other. The coolant flow field 66 is connected to and communicates fluidically with the coolant supply passage 36a and the coolant discharge passage 36b. The coolant flow field 66 is formed by overlapping together the back surface shape of the first metal separator 30 on which the oxygen-containing gas flow field 48 is formed, and the back surface shape of the second metal separator 32 on which the fuel gas flow field 58 is formed. The first metal separator 30 and the second metal separator 32 are joined by welding the outer peripheries of the separators and the peripheries of the passages 34a, 34b, 36a, 36b, 38a, and 38b. The first metal separator 30 and the second metal separator 32 may be joined together by brazing instead of welding.

As shown in FIG. 2, the terminal plates 16a and 16b are made of a conductive material. The terminal plates 16a, 16b are made of a metal such as, for example, copper, aluminum or stainless steel. The terminal plates 16a and 16b may each have at the center a terminal portion extending outward in the stacking direction.

The insulators 18a and 18b are formed of an insulating material. The insulating material is, for example, polycarbonate (PC) or phenol resin. The insulators 18a and 18b each have, in a central portion thereof, a recessed portion 76a and 76b opened toward the stack body 14. Each of the recessed portions 76a and 76b may have a hole through which the end portion passes, on the bottom surface.

The insulator 18a and the end plate 20a have the oxygen-containing gas supply passage 34a, the coolant supply passage 36a, and the fuel gas discharge passage 38b at one end in the direction indicated by the arrow B. The insulator 18a and the end plate 20a have the fuel gas supply passage 38a, the coolant discharge passage 36b, and the oxygen-containing gas discharge passage 34b at the other end in the direction of the arrow B.

As shown in FIGS. 2 and 3, the recessed portion 76a of the insulator 18a accommodates the terminal plate 16a. Further, the recessed portion 76b of the insulator 18b accommodates the terminal plate 16b.

As shown in FIG. 1, the connecting bar 24 is disposed between each side of the end plate 20a and the corresponding side of the end plate 20b. One end of each connecting bar 24 is fixed to the end plate 20a by bolts 26. The other end of each connecting bar 24 is fixed to the inner surface of the end plate 20b via bolts 26. Each connecting bar 24 applies a tightening load in the stacking direction to the stack body 14. Each connecting bar 24 connects the fuel cell stacks 10.

The operation of the fuel cell 12 configured as described above will be described below.

First, as shown in FIG. 1, an oxygen-containing gas is supplied to the oxygen-containing gas supply passage 34a of the end plate 20a. The oxygen-containing gas is a gas containing oxygen, for example, air. Further, fuel gas is supplied to the fuel gas supply passage 38a of the end plate 20a. The fuel gas is a gas containing hydrogen. A coolant is supplied to the coolant supply passage 36a on the end plate 20a. The coolant is pure water, ethylene glycol, or oil.

As shown in FIG. 4, the oxygen-containing gas flows from the oxygen-containing gas supply passage 34a into the oxygen-containing gas flow field 48 of the first metal separator 30 via a bridge portion 80 (see FIG. 5). At this time, the oxygen-containing gas flows from the oxygen-containing gas supply passage 34a into the back surface 30b of the first metal separator 30 (between the first metal separator 30 and the second metal separator 32). The oxygen-containing gas passes through the bridge portion 80 and flows out of the bridge portion 80 through the openings 86c. The oxygen-containing gas flows into the surface 30a of the first metal separator 30. The oxygen-containing gas flows along the oxygen-containing gas flow field 48 in the direction indicated by the arrow B. The oxygen-containing gas is used for the reaction of the cathode 44 on the membrane electrode assembly 28a.

On the other hand, the fuel gas flows from the fuel gas supply passage 38a into the fuel gas flow field 58 of the second metal separator 32 through a bridge portion 90 (see FIG. 9). The fuel gas flows in the direction of arrow B along the fuel gas flow field 58. The fuel gas is supplied to the reaction at the anode 42 on the membrane electrode assembly 28a.

Therefore, in each of the membrane electrode assemblies 28a, the oxygen-containing gas is consumed by the electrochemical reaction in a second electrode catalyst layer 44a, and the fuel gas is consumed by the electrochemical reaction in a first electrode catalyst layer 42a. Through these electrochemical reactions, the membrane electrode assembly 28a generates power.

Next, the oxygen-containing gas is supplied to the cathode 44 and partially consumed. The unconsumed oxygen-containing gas flows from the oxygen-containing gas flow field 48 through the bridge portion 82 to the oxygen-containing gas discharge passage 34b. The oxygen-containing gas is discharged in the direction indicated by the arrow A along the oxygen-containing gas discharge passage 34b. Similarly, the fuel gas is supplied to the anode 42 and partially consumed. The unconsumed fuel gas flows from the fuel gas flow field 58 through a bridge portion 92 to the fuel gas discharge passage 38b. The fuel gas is discharged in the direction of the arrow A along the fuel gas discharge passage 38b.

The coolant is supplied to the coolant supply passage 36a. The coolant flows into the coolant flow field 66 formed between the first metal separator 30 and the second metal separator 32. Thereafter, the coolant flows in the direction of arrow B. The coolant cools the membrane electrode assembly 28a and then flows out from the coolant discharge passage 36b.

Second Embodiment

Figure 10A:
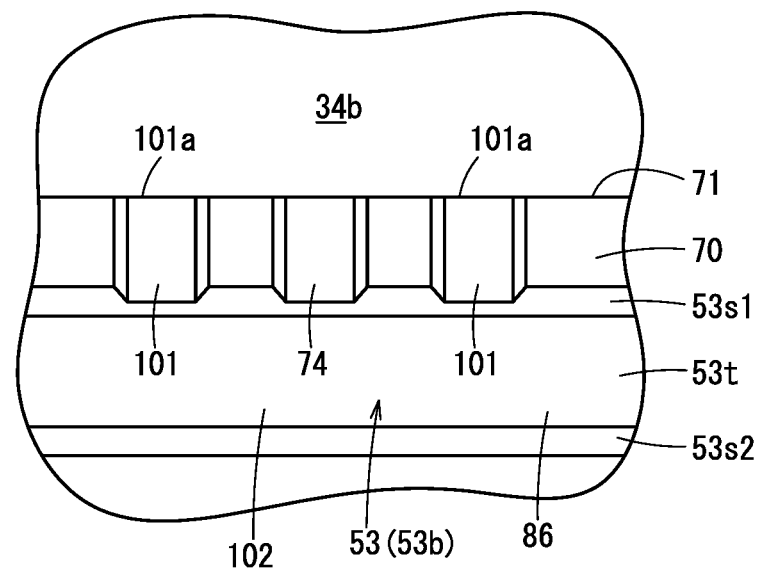
FIG. 10A is a partially enlarged plan view illustrating a tunnel and an extending portion according to a second embodiment.
Figure 10B:
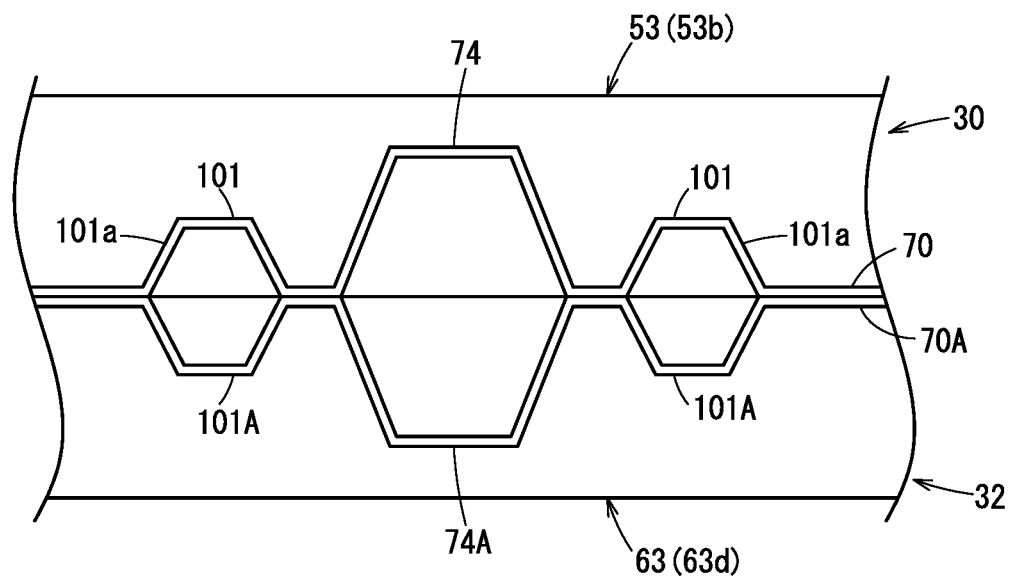
FIG. 10B is an end view of the tunnel and the extending portion of FIG. 10A as viewed from the inside of the passage.

Hereinafter, the tunnels 74, 74A and extending portions 101, 101A of the second embodiment will be described below with reference to FIGS. 10A and 10B. Note that the fuel cells 12 of the present embodiment differ only in the configuration of the extending portions 101 and 101A, and the other configurations are similar to the configurations of the respective elements of the fuel cells 12 described with reference to FIGS. 1 to 9. In FIGS. 10A and 10B, the same components as those described with reference to FIGS. 1 to 9 are denoted by the same reference numerals, and detailed description thereof will be omitted.

As shown in FIG. 10A, the first metal separator 30 of the present embodiment has the extending portions 101 lateral to the tunnel 74. Each extending portion 101 is formed on the straight portion 102 of the passage bead seal 53b in a portion adjacent to the tunnel 74. The extending portion 101 extends from the inner peripheral side wall 53s1 of the passage bead seal 53b toward the inner peripheral edge 71 of the flange portion 70. The extending portion 101 is formed to have the same length as the flange portion 70. The extending portion 101 has an inner peripheral end portion 101a on the inner peripheral side. The inner peripheral end portion 101a opens at the inner peripheral edge 71 of the flange portion 70. As shown in FIG. 10B, the height of the extending portion 101 is lower than that of the tunnel 74. The height of the extending portion 101 may be, for example, approximately half the height of the tunnel 74.

As shown in FIG. 10B, the second metal separator 32 has a tunnel 74A in a portion corresponding to the tunnel 74 of the first metal separator 30. The second metal separator 32 has an extending portion 101A lateral to the tunnel 74A. The cross-sectional shape of the extending portion 101A is a symmetrical shape obtained by vertically inverting the cross-sectional shape of the extending portion 101. Accordingly, the extending portion 101A also opens to the oxygen-containing gas discharge passage 34b.

Analysis Example

Hereinafter, results obtained by calculating the surface pressure distribution in the vicinity of the tunnel 74 of the passage bead seal according to the first embodiment, the second embodiment, and a comparative example will be described.

Figure 11:
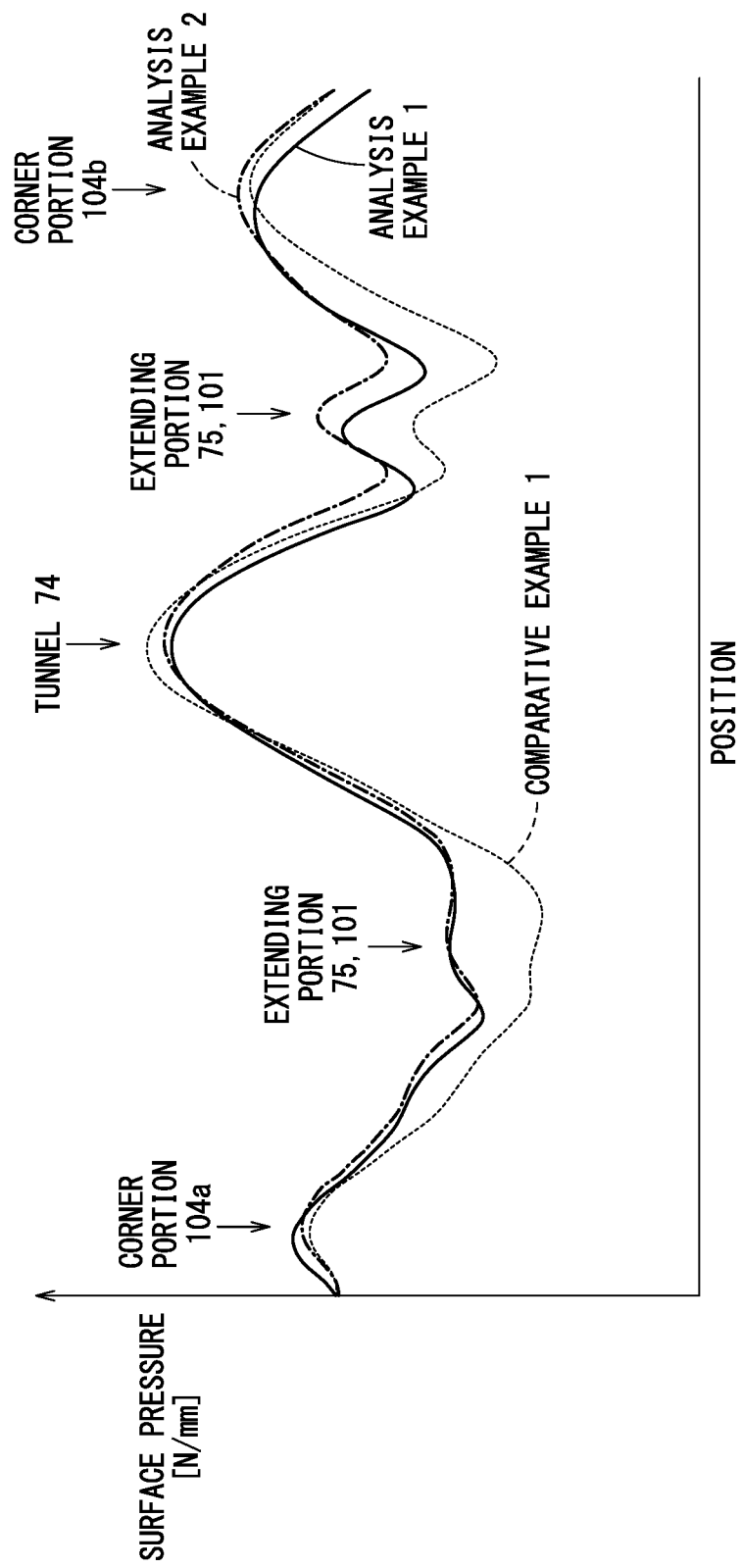
FIG. 11 is a graph showing calculation results of surface pressure distribution along passage bead seals according to the embodiments and a comparative example.

FIG. 11 shows a result obtained by calculating a distribution of surface pressure generated when the passage bead seal 53 of the first metal separator 30 is brought into contact with the resin film equipped MEA 28. The surface pressure is a pressure acting on the surface of the bead seal when a predetermined tightening load is applied to the fuel cell 12 by the plurality of connecting bars 24. A uniform surface pressure distribution means that the gas-tightness over the entire bead seal is uniform over the entire area. A non-uniform surface pressure distribution suggests that there is a portion where gas-tightness is likely to decrease in a part of the bead seal.

Comparative Example 1 shows a calculation result of a distribution of surface pressure of the passage bead seal 53 in a case where the extending portions 75, 101 are not provided on both sides of the tunnel 74. As shown in the drawing, according to the calculation result of Comparative Example 1, the surface pressure greatly decreases on both sides of the tunnel 74.

On the other hand, Analysis Example 1 shows a surface pressure distribution in a case where the extending portions 75 of the first embodiment shown in FIG. 6A is disposed on both sides of the tunnel 74. As shown in FIG. 11, the calculation result of Analysis Example 1 suppresses a decrease in surface pressure. The low-height extending portions 75 near the tunnel 74 increase the rigidity of the passage bead seal 53 on both sides of the tunnel 74. This result indicates that the extending portions 75 can suppress a decrease in the surface pressure of the passage bead seal 53.

Analysis Example 2 shows a distribution of surface pressure in a case where the extending portions 101 (the second embodiment) having the structure shown in FIG. 10A is disposed on both sides of the tunnel 74. The result of Analysis Example 2 shows that the extending portions 101 can also suppress a decrease in the surface pressure of the passage bead seal 53 on both side portions of the tunnel 74.

Hereinafter, effects of the fuel cell 12 (power generation cell) according to the first embodiment and the second embodiment of the present invention will be described.

According to the present embodiments, there is provided a fuel cell 12 including a membrane electrode assembly (e.g., MEA 28) and metal separators (e.g., the first metal separator 30 and the second metal separator 32) disposed on both sides of the membrane electrode assembly, the membrane electrode assembly and the metal separators being stacked together. Each of the metal separators is formed with: a reactant gas flow field (e.g., the oxygen-containing gas flow field 48 and the fuel gas flow field 58) through which a reactant gas flows along an electrode surface of the membrane electrode assembly; a passage (e.g., the oxygen-containing gas supply passage 34a, the oxygen-containing gas discharge passage 34b, the fuel gas supply passage 38a, the fuel gas discharge passage 38b) that penetrates through the separator in a separator thickness direction; and a passage bead seal 53 that surrounds the outer periphery of the passage and protrudes in the separator thickness direction to thereby seal the passage. The passage bead seal 53 is provided with a tunnel 74 that protrudes from the passage bead seal 53 toward the passage, the tunnel 74 being configured to allow an internal space 53f of the passage bead seal 53 to communicate with the passage. The passage bead seal is further provided with an extending portion 75, 97, 101 which is located lateral to the tunnel 74, 74A so as to extend from the passage bead seal 53 toward the passage, the extending portion being lower in height than the tunnel 74, 74A.

The fuel cell 12 has an extending portion 75, 97, 101, which is lateral to the tunnel 74, 74A. The extending portion 75, 97, and 101 improve the rigidity of the straight portion 102 of the passage bead seal 53 near the tunnel 74, 74A. As a result, as shown in FIG. 11, the fuel cell 12 reduces or suppresses non-uniformity in surface pressure distribution of the passage bead seal 53, 63.

In the fuel cell 12 described above, the extending portion 75, 75A may be provided on each of both sides of the tunnel 74, 74A. In this fuel cell 12, the rigidity of the passage bead seal 53, 63 on both sides of the tunnel 74, 74A can be improved, and a decrease in surface pressure on both sides of the tunnel 74 can be suppressed.

In the fuel cell 12 described above, the extending portion 75 may not communicate with the passage. In the fuel cell 12, since no flow path is added, unevenness in the surface pressure distribution of the passage bead seal 53 is suppressed without affecting the fluid flowing through the passage.

In the fuel cell 12 described above, the tunnel 74, 74A, and the extending portions 75, 97, and 101 may be provided on the straight portion 102 of the passage bead seal 53, 63. In the fuel cell 12, the rigidity of the straight portion 102 of the passage bead seal 53, 63, which tend to be insufficient in rigidity, can be increased, and non-uniformity in surface pressure distribution of the passage bead seal 53, 63 can be suppressed.

In the fuel cells 12 described above, the passage bead seal 53, 63 may include a plurality of corner portions 104 and a connecting portion (e.g., the straight portion 102) connecting the corner portions 104, and the tunnel 74, 74A and the extending portion 75, 97, 101 may be formed at the connecting portion located between the corner portions 104. Here, the connecting portion is not limited to a strict straight line, and is a portion provided between the corner portions 104 which are largely bent, and more specifically includes a portion which appears to be a straight line in a global view even in the case where a small meandering or a gentle curve is included. According to the fuel cell 12, since a portion where rigidity is likely to decrease can be reinforced by the extending portion 75, 97, and 101 having a low height, non-uniformity in surface pressure distribution of the passage bead seal 53, 63 can be suppressed.

In the fuel cell 12 described above, a bridge portion 82 may be provided on a side of the passage bead seal 53 that faces a power generation portion, the bridge portion 82 being configured to intersect the passage bead seal 53 to thereby allow the passage to communicate with the reactant gas flow field, and the tunnel 74 and the extending portion 75 may be formed on another side of the passage bead seal 53 on which the bridge portion 82 is not provided.

Although the present invention has been described with reference to preferred embodiments, it is needless to say that the present invention is not limited to the above-described embodiments and various modifications can be made without departing from the essence and gist of the present invention.

What is claimed is:

1. A fuel cell comprising a membrane electrode assembly and metal separators disposed on both sides of the membrane electrode assembly, the membrane electrode assembly and the metal separators being stacked together, wherein
each of the metal separators is formed with: a reactant gas flow field through which a reactant gas flows along an electrode surface of the membrane electrode assembly; a passage that penetrates through the separator in a separator thickness direction; and a passage bead seal that surrounds the passage and protrudes in the separator thickness direction to thereby seal the passage,
the passage bead seal is provided with a tunnel that protrudes from the passage bead seal toward the passage, the tunnel being configured to allow an internal space of the passage bead seal to communicate with the passage, and
the passage bead seal is further provided with an extending portion which is disposed on a side of the tunnel so as to extend from the passage bead seal toward the passage, the extending portion being lower in height than the tunnel.

2. The fuel cell according to claim 1, wherein the extending portion is provided on either side of the tunnel.

3. The fuel cell according to claim 1, wherein the extending portion does not communicate with the passage.

4. The fuel cell according to claim 1, wherein the tunnel and the extending portion are provided in a straight portion of the passage bead seal.

5. The fuel cell according to claim 1, wherein the passage bead seal includes a plurality of corner portions and a connecting portion connecting the corner portions, and the tunnel and the extending portion are formed at the connecting portion located between the corner portions.

6. The fuel cell according to claim 1, wherein a bridge portion is provided on a side of the passage bead seal that faces a power generation portion, the bridge portion being configured to intersect the passage bead seal to thereby allow the passage to communicate with the reactant gas flow field, and the tunnel and the extending portion are formed on another side of the passage bead seal on which the bridge portion is not provided.

* * * * *